United States Patent [19]

Middelhoven

[11] 4,320,814
[45] Mar. 23, 1982

[54] ELECTRIC-HYDROSTATIC DRIVE MODULES FOR VEHICLES

[75] Inventor: Paul J. Middelhoven, Portland, Oreg.

[73] Assignee: Paccar Inc., Bellevue, Wash.

[21] Appl. No.: 62,365

[22] Filed: Jul. 31, 1979

[51] Int. Cl.³ ............................................. B60K 17/10
[52] U.S. Cl. .................................... 180/294; 180/299;
180/65 R; 180/307; 180/312; 248/639
[58] Field of Search ............... 180/294, 299, 298, 305,
180/307, 312, 308, 306, 65 R, 65 E, 60, 292,
242, 295, 89.17, 69 R; 248/639, 671, 669;
60/DIG. 10, 485, 484

[56] References Cited

U.S. PATENT DOCUMENTS

| | | | |
|---|---|---|---|
| 1,199,708 | 9/1916 | Mueller | 180/294 |
| 1,323,890 | 12/1919 | Manly | 180/242 |
| 1,886,035 | 11/1932 | Mann | 248/639 |
| 1,887,862 | 11/1932 | Simmen | 248/639 |
| 2,656,152 | 10/1953 | Moon | 180/306 |
| 3,098,574 | 7/1963 | De Marco | 180/65 R |
| 3,344,879 | 10/1967 | Glomb et al. | 180/242 |
| 3,826,326 | 7/1974 | Blair | 180/305 |
| 4,049,072 | 9/1977 | Savage | 180/307 |
| 4,119,169 | 10/1978 | Hopkins | 180/307 |

FOREIGN PATENT DOCUMENTS 22071 2/1956 Fed. Rep. of Germany ...... 248/639

OTHER PUBLICATIONS

"Jeffrey Diesel Ramcar".

*Primary Examiner*—David M. Mitchell
*Attorney, Agent, or Firm*—Klarquist, Sparkman, Campbell, Leigh, Whinston & Dellett

[57] ABSTRACT

An electric-hydrostatically powered vehicle has an electric motor connected through a gear box to a hydrostatic pump which powers the vehicle. The vehicle chassis includes a main frame portion and a removable subframe portion which is resiliently mounted in spaced-apart, overlying relationship on the main frame portion. The subframe provides a platform for mounting the motor, gear box and pump independently of the main frame of the vehicle to define a removable drive module. The subframe provides planar mounting surfaces that enable translational and angular positioning of the motor and gear box in three dimensions to align their shafts. The module is preassembled by mounting the motor and gear box on the platform, aligning and connecting their shafts, and securing the motor and gear box to the platform. Thereafter, the module is installed as a unit into the vehicle, the alignment of the shafts being undisturbed. A three-point resilient mount isolates the subframe from shock and vibrations imparted in the main frame.

14 Claims, 9 Drawing Figures

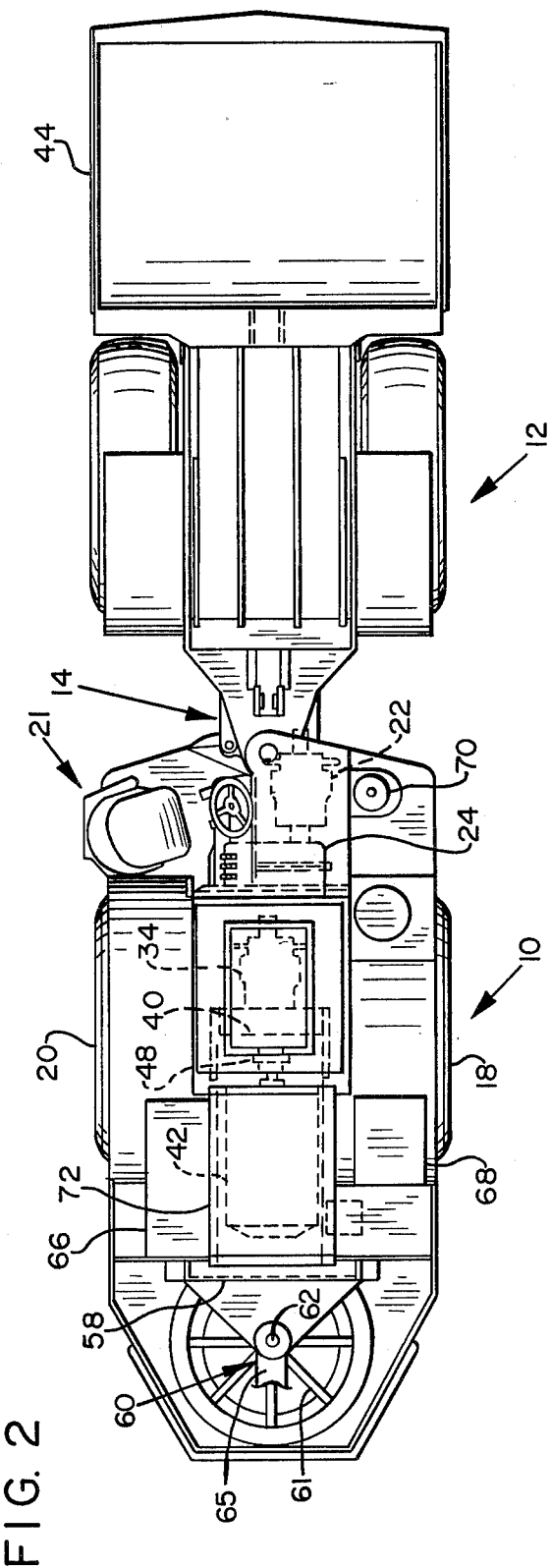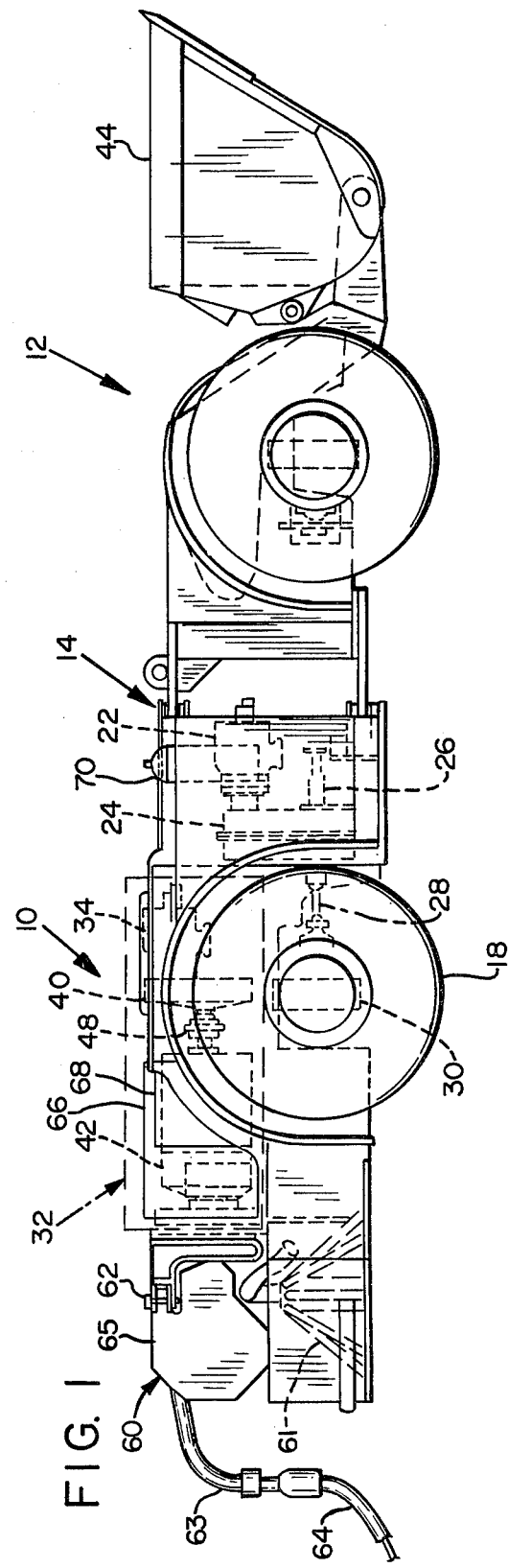

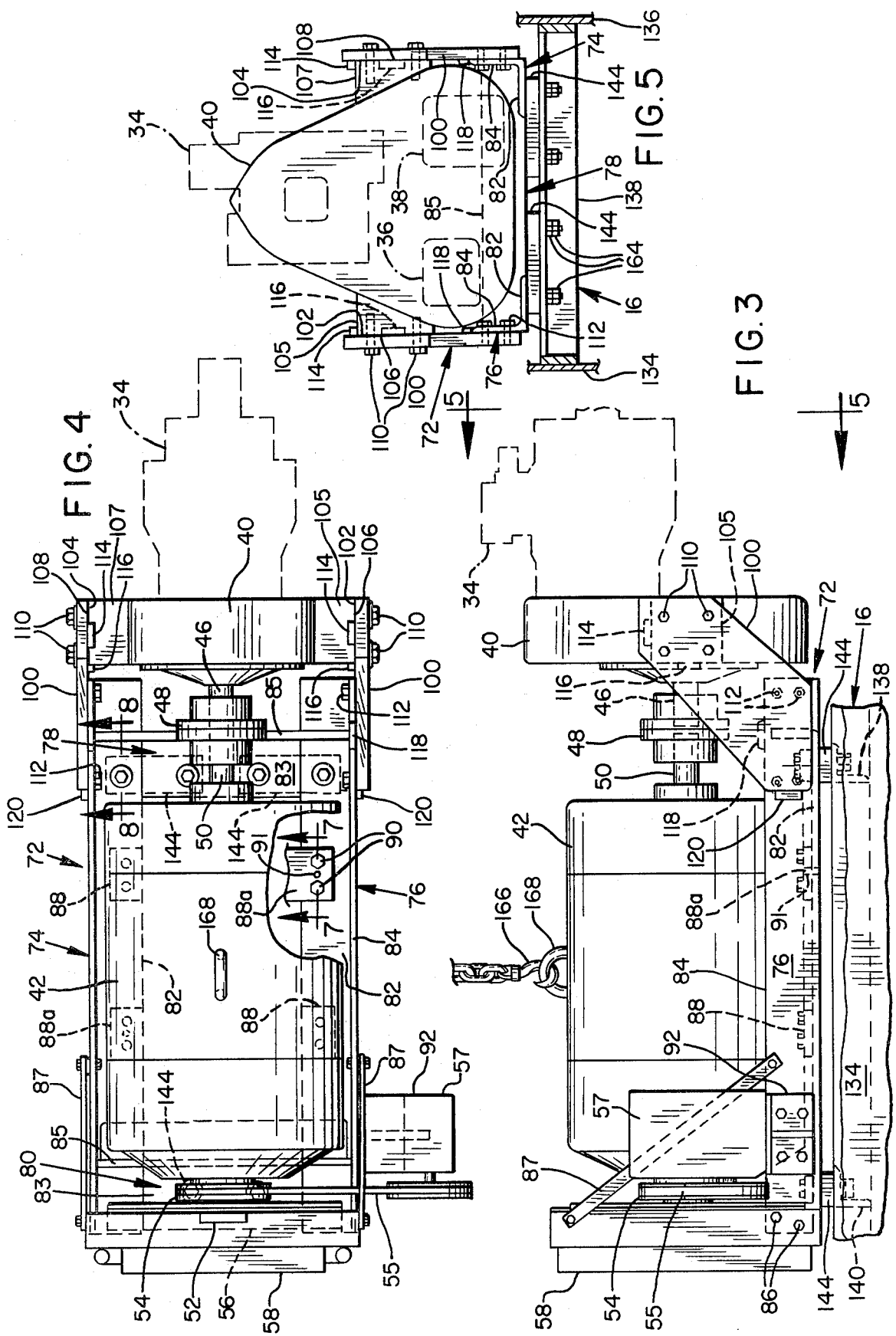

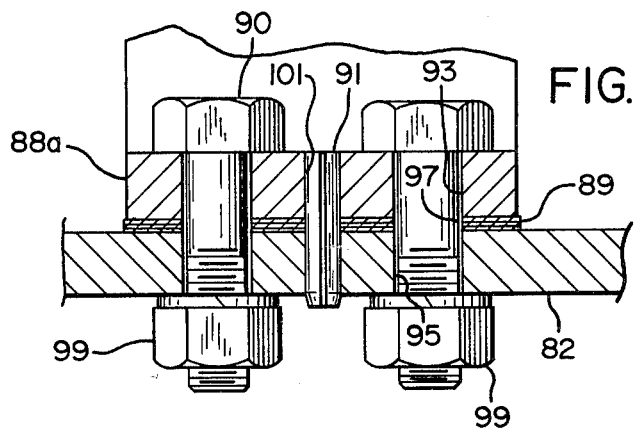
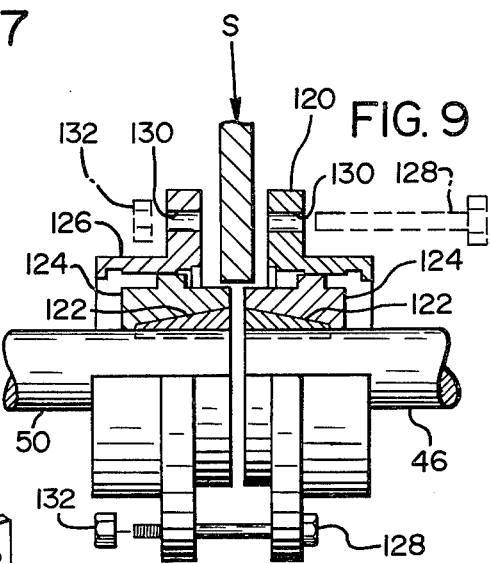
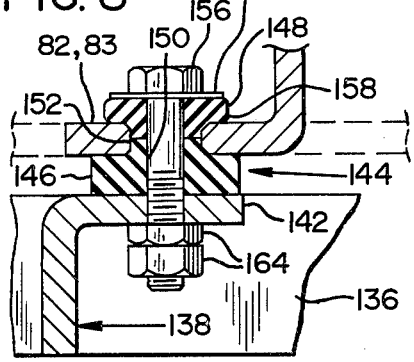
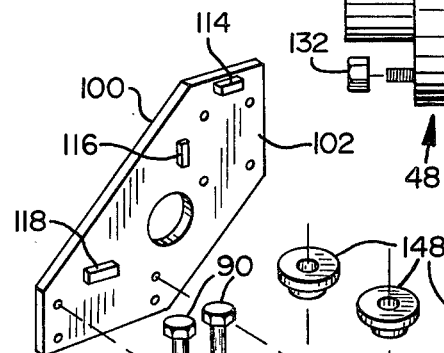
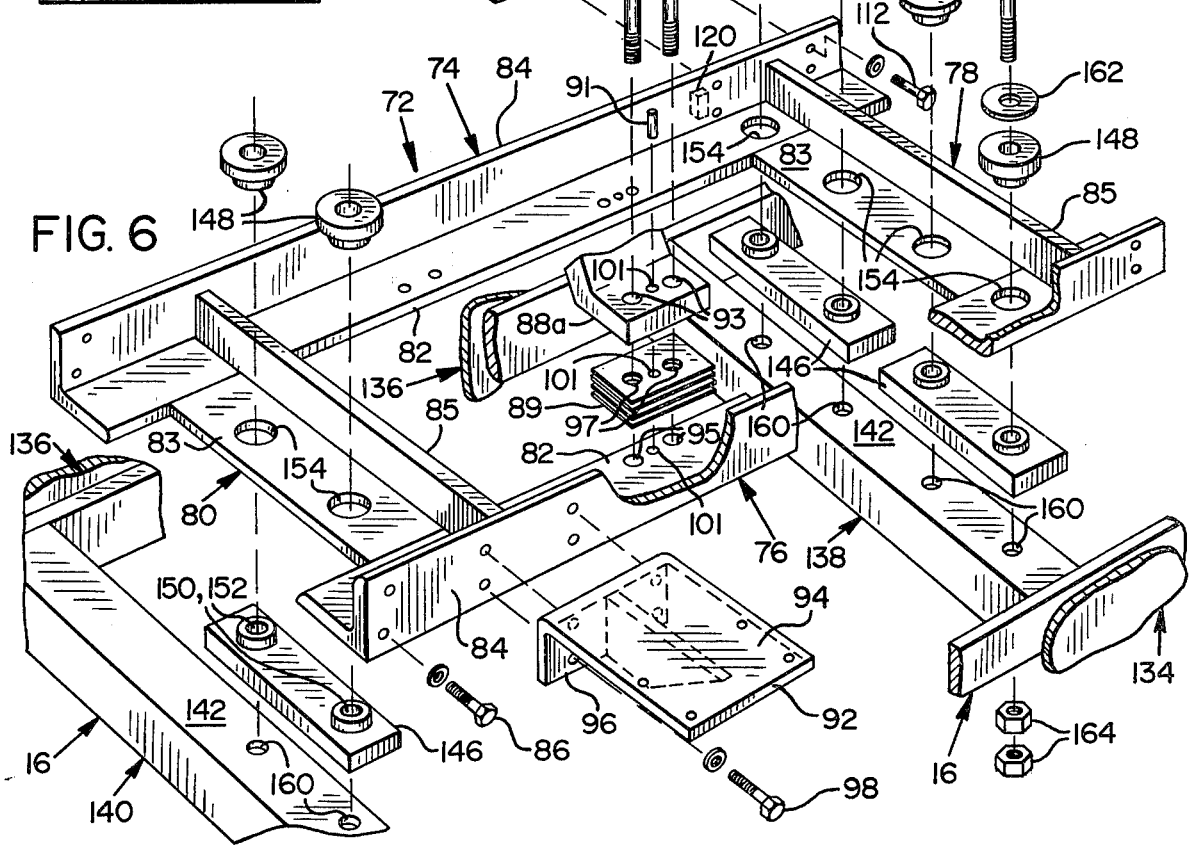

ELECTRIC-HYDROSTATIC DRIVE MODULES FOR VEHICLES

BACKGROUND OF THE INVENTION

The invention relates generally to electric-hydrostatic drive systems for vehicles and more particularly to the preassembly and alignment of the components of such systems externally of a vehicle for installation into the vehicle as a unit.

Electric-hydrostatic drive systems are commonly used in load, haul and dump (LHD) vehicles, particularly in low-profile, articulated frame vehicles of the type used in underground mining. Such systems are generally preferred over internal combustion engine drive systems because they are less likely to ignite explosive gases in the mines and because they do not produce noxious fumes.

However, maintenance and repair of electric-hydrostatic drive systems have been perennial problems. The principal difficulty arises in the alignment and connection of the output shaft of the electric motor with the input shaft of the gear box which drives the hydraulic pumps. Unless the shafts are aligned to very close tolerances, their rotation will cause translational vibrations that will quickly wear out the bearings in both the motor and the gear box.

Previously, the motor and gear box have been mounted separately on the vehicle chassis and aligned in situ, which is a difficult and time-consuming process often requiring the mechanic to work in very awkward positions. Working in such positions with very heavy components, for example, 200 h.p. electric motors, makes precision alignment of the shafts extremely difficult.

The circumstances under which the mechanic typically works make the problem even more difficult. The vehicles are used in mines that can be hundreds of feet deep. Being very large, for example, weighing 15 to 30 tons, the vehicles are usually lowered into the mine in pieces through a narrow mine shaft and assembled in the mine. Because removal from the mine would require disassembly of the vehicle, maintenance, including major overhauls, is usually performed in the mine. Only the vehicle's components are removed from the mine for overhaul in an above-ground shop.

Compounding the problem is the frequency of overhauls of the electric-hydrostatic drive system. The vehicles are ordinarily operated 24 hours a day. Since the time between overhauls is typically between 2000 and 2500 hours, the drive system in each vehicle must be overhauled about three times a year. Each overhaul requires removal of the worn out motor, gear box and hydrostatic pumps and their replacement with new or rebuilt components. Each time this is done the components must be realigned. Removal and replacement of such drive systems typically takes about 16 hours. This takes a very expensive vehicle out of commission for two shifts and requires at least two man-days of highly-skilled mechanic's time to accomplish the exchange.

The foregoing alignment problems do not ordinarily arise with internal combustion engine drive systems. Such engines require a flywheel for leveling their power flow. The flywheel is machined to very close tolerances and thus provides a large, precise surface on the engine's output shaft for connecting the input shaft of the gear box. The engines are also often provided with a bell housing which is machined for precisely mounting the gear box. Where used, internal combustion drive systems can be replaced in as little as 8 hours.

Although electric motors do not require a flywheel and bell housing, such parts have been artificially adapted to electric-hydrostatic drive systems in an attempt to solve the alignment problem. However, this approach requires special parts that are very expensive because of their limited utility and their need for precision machining.

Another approach to the alignment problem has been to use rotating shaft connectors that are designed to accommodate a limited range of misalignment of the shafts without vibrations resulting. However, it is still necessary to align the shafts to within relatively close tolerances to obtain significant reductions in vibration with such connectors. Alignment remains very difficult to accomplish under the foregoing conditions.

Another difficulty in using an electric-hydrostatic drive system is the difficulty in maintaining the alignment of the motor and gear during operation of the vehicle. Typically the motor and gear box are mounted independently on the chassis and connected along their opposite sides to the chassis frame members. Consequently, torsional stresses on the frame, as the vehicle moves over uneven terrain, are transmitted to the motor and gear box, at least temporarily deflecting their connected shafts out of alignment, and sometimes resulting in breakage of the mounts or the shaft connector.

One approach to this problem has been to mount the motor on a three-point mount to reduce the stress applied to the motor. Another approach can be to use rubber mounts to absorb some of the stress. However, neither approach is satisfactory where the motor and gear box are independently mounted directly on the frame. These approaches reduce, but do not eliminate, relative movement between the motor and gear box about the interconnection of their shafts.

Therefore, there remains a need for a better way to mount electric-hydrostatic drive system components in vehicles.

SUMMARY OF THE INVENTION

A primary object of the invention is to simplify installation of the drive system in the vehicle.

Another primary object of the invention is to reduce the need for maintenance and repair of the drive system. A further object is to reduce the time required for overhauling electric-hydrostatic drive systems.

According to the invention, at least the critically-aligned components of an electric-hydrostatic drive system are preassembled on a platform, independently of the vehicle chassis, to define a unitary drive module. The vehicle chassis has a frame with an upwardly directed surface defining a bed means for receiving the platform thereon. This design permits the drive system to be overhauled and assembled on the platform above ground, transported into a mine without disassembly, and installed as a unit into the vehicle.

The platform is resiliently connected to the frame of the vehicle by resilient mounting means. The mounting means space the platform above the frame and absorb much of the vibration, shock and stress transmitted through the frame. In addition, using three such mounts arranged triangularly, rather than four or more, virtually isolates the module from the frame. This further reduces the stress and shock transmitted to the drive system.

The critically-aligned components, such as an electric motor and gear box, are preassembled on the platform, aligned, and rigidly secured in position with their shafts drivingly connected in end-to-end relationship, prior to installation of the module into the vehicle. Other drive system components that can be added to the module prior to installation include hydrostatic or other hydraulic pumps drivably connected to the gear box, cooling means including a fan for cooling the pumped hydraulic fluid, and an air compressor driven by the motor to power air brakes. Isolation of such components from the frame on a rigid platform substantially reduces relative movement between the components, preventing breakage of mounts and shaft connectors during operation of the vehicle.

The platform is designed so that the critically-aligned components can be translationally and angularly positioned in three dimensions to align them. In one embodiment, the platform is a subframe portion of the chassis having a flat horizontal surface providing support for the motor. The motor has flat-bottomed feet permitting it to be slid on such surface to align its shaft in the horizontal plane. The platform also has two inwardly-opposed parallel flat surfaces for mounting the gear box therebetween. The gear box casing has two flat mounting surfaces on its opposite sides parallel to the input shaft which enable positioning of the shaft in the longitudinal vertical plane. Shims are placed under the feet as needed to elevate portions of the motor and thus provide vertical adjustment means.

Incorporation of the foregoing features into the platform alleviates much of the difficulty of aligning electrostatic drive system components. It eliminates the need for precision-machined mounting surfaces in the chassis. It allows the mechanic to have easy access to the drive system. And it enables easy, precise alignment of the shafts of the motor and gear box without adding extraneous parts to the drive system.

The foregoing and other objects, features and advantages of the invention will become more apparent from the following detailed description of a preferred embodiment of the invention, which proceeds with reference to the drawings.

BRIEF DESCRIPTION OF THE DRAWING

FIG. 1 is a side elevational view of an electric-hydrostatic drive, articulated frame vehicle according to the invention, the drive system being shown in hidden lines.

FIG. 2 is a top plan view of the vehicle of FIG. 1, with the drive system shown in hidden lines.

FIG. 3 is a side elevational view of the electric-hydrostatic drive module according to the invention, the hydrostatic pump being shown in phantom lines.

FIG. 4 is a top plan view of the module of FIG. 3.

FIG. 5 is an end elevational view taken along lines 5—5 in FIG. 3 and showing additionally, the hydraulic hoist and steering pumps in phantom lines.

FIG. 6 is an exploded perspective view of the platform of the present invention taken from an upper rear side position, portions of the main frame, the platform mounts, a motor mounting foot and shims included.

FIG. 7 is a cross-sectional view of pinned motor mounting foot taken along line 7—7 in FIG. 4.

FIG. 8 is a cross-sectional view of a platform mount taken along line 8—8 in FIG. 4.

FIG. 9 is a cross-sectional view of the shaft connector during alignment, a portion being cut away to show interior features.

DETAILED DESCRIPTION OF A PREFERRED EMBODIMENT

General Assembly

Referring to FIG. 1, an electric-hydrostatic drive articulated-frame vehicle has a rear chassis portion 10 and a front chassis portion 12 connected intermediately about a hinge 14. The front chassis portion is conventional in articulated-frame load, haul and dump (LHD) vehicles and, forming no part of the present invention, will not be described further herein.

The rear chassis portion includes a main frame portion 16 (FIGS. 3, 5 and 6) supported upon transversely extending axles between two rear wheels 18, 20. At the front of the rear chassis portion, alongside operator station 21, is a hydrostatic drive motor 22 connected to a transmission 24 mounted on a lower part (not shown) of the main frame portion. A front output drive shaft 26 extends longitudinally from the transmission toward the front chassis portion for driving the front wheels. Similarly, a rear output shaft 28 is connected to a rear differential 30 for driving the rear wheels.

The electric-hydrostatic drive system, indicated generally in FIG. 1 by dashed lines and reference numeral 32, powers the vehicle. The system includes a hydrostatic pump 34, hydraulic pumps 36, 38 (FIG. 5), a gear box 40 and an electric motor 42. Such components are arranged generally longitudinally along the rear chassis portion.

The pumps are drivably connected to, and supported by, gear box 40 via three self-aligning, spline-type drive shafts (not shown). The pumps provide pressurized fluid via hydraulic hoses to, respectively, motor 22, the steering mechanism (not shown) and the hydraulic cylinders (not shown) which hoist dump bucket 44.

Referring to FIGS. 3, 4 and 9, gear box 40 has a rotatable input shaft 46 drivably connected by connector means 48 in end-to-end axial relationship to a first output shaft 50 of motor 42. The connector and a procedure for aligning shafts 46 and 50 for connection will be described hereinafter.

At the other end of motor 42 is a second output shaft 52 (FIG. 4) drivably mounting a pulley sheave 54 and a fan 56 for inducing air through a hydraulic fluid cooler 58. Pulley 55 is drivably connected to air brake compressor 57 mounted alongside motor 42.

Rearward of the drive system is cable-handling system 60 (FIGS. 1 and 2) mounted by means of a pivot 62 to the rear chassis portion. System 60 includes a basket 61 for storing electrical cable 64, an end of which protrudes from snout 63. System 60 also includes a drive mechanism 65 for paying the cable in and out. A connector (not shown) connects the cable to a suitable electricity source for operating the electric motor. The opposite end of the cable (not shown) is connected to the motor through an electric control box 66 for controlling the motor. Alongside the motor is a hydrostatic tank or reservoir 68 for supplying fluid to the hydrostatic pump. Alongside hydrostatic motor 22 is a hydraulic reservoir and filter 70 for filtering the fluid for pumps 36, 38. The elements identified by reference numerals 60 to 70 are mounted on the main frame portion of the vehicle and form no part of the present invention. Therefore, further description of such parts is omitted herein.

Subframe Assembly

Referring to FIGS. 3, 4 and 5, the electric motor, gear box, compressor, and cooler are mounted on a platform 72 which is a subframe portion of the rear chassis. The platform includes two longitudinal subframe members 74, 76 and two subframe cross members 78, 80. Such members are structural angle beams having an L-shaped cross-section defined by horizontal flanges 82, 83 and vertical flanges 84, 85, respectively. The longitudinal members are of equal length and spaced apart with their vertical flanges directed upwardly and positioned along opposite sides of the platform. Similarly, the cross members are spaced apart and extend normally between the longitudinal members. The cross members are rigidly connected to the longitudinal members, for example, by welding. The horizontal flanges 83 of the cross-members are co-planar with horizontal flanges 82 of the longitudinal members. Thus, members 74, 76, 78 and 80 define a horizontal rectangle with horizontal flanges 82, 83 defining an interior horizontal upwardly-directed, planar surface with its outer periphery defined by upwardly-extending vertical flanges 84, 85.

Cooler 58 is transversely mounted at the rear of the platform. The cooler is secured to the platform by bolts 86 extending horizontally through vertical flanges 84. Diagonal braces 87 extend from opposite sides of the top of the cooler to connection points along the outer sides of flanges 84.

Motor 42 is mounted in the middle of the platform with its four feet 88, 88a resting on flanges 82 along opposite sides of the platform. Feet 88, 88a have flat, co-planar lower surfaces for slidingly contacting the upper surfaces of such flanges to align shafts 46, 50 horizontally. Referring to FIGS. 6 and 7, shims 89 may be inserted beneath the feet as needed, to elevate or level the motor to align such shafts vertically. Two bolts 90 extend through holes 93, 95, 97 and have nuts 99 threaded thereon to secure each of the four feet to the platform. After aligning the shafts, holes 101 are drilled through two diagonally-positioned feet 88a, flanges 82 and any shims that have been placed therebetween. Then, tight fitting, roll-type spring pins 91 are driven into holes 101 to rigidly secure such feet laterally to the platform. Thus, the feet provide laterally adjustable support means for the motor, the shims provide vertical adjustment means for elevating the motor, and the bolts and pins provide securing means for rigidly securing the motor to the platform.

Adjacent to a rear portion of motor 42, the platform includes means for mounting compressor 57, including bracket 92. In FIG. 6 bracket 92 has a horizontal upper mounting face 94 for receiving the compressor and a downwardly extending reinforced flange 96 for securing the bracket by bolts 98 to the outerside of flange 84 of member 76.

Connected to the outer sides of vertical flanges 84 are two diagonal bracket members 100 forming an upwardly extending gear box bracket at the front of the platform. In FIGS. 4 and 5, members 100 have inwardly-opposed parallel planar faces 102, 104 for contacting flat parallel opposite side faces 106, 108 of mounting blocks 105, 107, which are connected to opposite sides of gear box 40. Members 100 are secured to the vertical flanges by bolts 112 and the gear box is secured between them by bolts 110. This arrangement permits the gear box to be raised, lowered and tilted, providing vertical ajustment means for positioning shaft 46 in vertical longitudinal plane.

Two rectangular shear blocks 114, 116 are connected to each of surfaces 102, 104 at the upper ends of bracket members 100. Blocks 114 are positioned along the upper sides of mounting blocks 105, 107. Blocks 116 are positioned along the rearward sides of the mounting blocks. Similarly, two shear blocks 118, 120 are positioned at the lower end of each member 100. Blocks 118 are connected to the inner surfaces of members 100 along the top edges of vertical flanges 84. Blocks 120 are connected to the outer faces of flanges 84 along the rearmost edges of bracket members 100.

The shear blocks are welded in place after the shafts of the gear box 40 and motor 42 have been aligned, and bolts 90, 110, and 112 have been tightened. Such blocks minimize the shearing stress on the bolts and assist in maintaining shaft alignment when hydrostatic pump 33 is attached to the gear box.

The shafts of the motor and gear box are aligned in end-to-end axial relationship, as mentioned above, and are connected by a conventional shaft connector 48. In FIG. 9, connector 48 includes a taper lock bushing 122, an internally tapered gear coupling 124 and a sleeve 126 around each shaft. Bolts 128 received in holes 130 through annular flange portions of the sleeves are circumferentially spaced around the connector to secure the sleeves together over the bushings and gear couplings. Nuts 132 are threaded onto bolts 128 and tightened to hold the connector together.

Referring to FIGS. 3-6, main frame portion 16 defines a platform-receiving portion of bed for mounting platform 72 thereon. The bed includes two parallel, spaced-apart longitudinal main frame members 134, 136 and two parallel, spaced-apart cross members 138, 140 normally connected members 134, 136. In FIG. 6 it can be seen that cross members 138, 140 are angle beams having horizontal flanges 142 defining an upwardly facing planar surface for receiving platform mounts 144 (FIG. 8) and platform 72 thereon.

Referring to FIGS. 6 and 8, three rubber mounts 144 provide a three-point mount for the platform. One mount is centered on rear cross member 140 and two mounts are positioned symmetrically along front cross members 138 to define a triangular mounting means. This structure provides substantial lateral stability for the platform while minimizing the transmission of torsional and other stresses from the main frame portion to the mounts. In addition, the mounts resiliently absorb vibration and any residual stresses transmitted from the main frame portion. Consequently, the platform and mounts substantially isolate the drive system from the chassis of the vehicle.

Each mount 144 includes a rectangular lower portion 146 and two generally cylindrical upper portions 148. Portion 146 has two vertically extending bolt holes 150 spaced lengthwise apart and surrounded along the upper side of the portion by cylindrical extensions 152. Extensions 152 and portions 148 are sized to fit cylindrical holes 154 in the cross-members of the platform. Portions 148 have vertical bolt holes therethrough for receiving bolts 156 and include an annular flange 158 around their top for contacting the upper surface of the platform. The cross-members of the main frame portion have bolt holes 160 positioned to register concentrically with holes 154 in the platform.

Platform 72 is mounted to overlie main frame portion 16, a subframe members 74–80 being spaced above the main frame members 134-140 by the lower portions of mounts 144. The upper portions of the mounts fit snugly in holes 154 and meet extensions 152 within such holes. Bolts 156 extend through washers 162 atop upper portions 148, through the bolt holes of portions 146 and 148, through holes 160 and are secured by double lock nuts 164.

Drive System and Subframe Installation

First, the main frame portion and the platform are assembled as aforesaid and holes are bored through the various surfaces to receive the above-identified bolts and mounts. Special care is taken in assembling the platform and in boring the holes for bolts 90, 110, and 112 to insure that the platform corners are square and that the holes are themselves aligned and are positioned such that the shafts can be aligned. Holes 93, 95 and 97 are slightly oversized (about 1/32") with respect to bolts 90 to permit the motor a small range of horizontal motion when bolts 90 are loose. The holes for bolts 110 and 112 are similarly oversized to permit the gear box to be tilted slightly to align its shaft in the vertical longitudinal plane.

The drive system is then preassembled on platform 72. The gear box 40 is positioned between members 100 with its input shaft 46 directed toward the rear of the platform and tilted as needed to align its shaft substantially parallel with the center-line of the platform. Bolts 110 are tightened after this alignment is accomplished to secure the gear box in place. The bushings, gear couplings and sleeves of connector 48 are installed on shafts 46, 50. The motor is then lowered onto the platform and positioned with its feet resting on flanges 82 and with output shaft 50 directed toward the gear box. The gear box is mounted in a position sufficiently elevated from the platform that the axis of its input shaft is no lower than the axis of the motor's output shafts.

In the next step, output shaft 50 is aligned with input shaft 46. In FIGS. 6 and 8, bolts 90 are dropped through bolt holes 93 in the feet, which are generally in registration with bolt holes 95 in flanges 82, but nuts 99 are left off the bolts for the time being. The motor is first moved longitudinally until the ends of the shafts are less than ¼" apart but not contacting. Portions of the electric motor are elevated by placing shims 89 under the legs to angularly and translationally align the axis of shaft 50 into the horizontal plane of the axis of shaft 46. Portions of the motor are also slid laterally to angularly and translationally align the axis of shaft 50 into the vertical plane of the axis of shaft 46. In FIG. 9 a straight edge S and a 0.005" feeler gauge (not shown) are used at 90° intervals around the connector to test for alignment of the shafts. If the shafts are still misaligned, the elevating and sliding steps are repeated as necessary. Once the shafts are aligned, nuts 99 are threaded onto bolts 90 of all four feet and tightened. Thereafter, the shafts are connected together by installing bolts 128 and tightening nuts 132.

The motor is next secured to the platform in three sub-steps. First, a new hole 101 is drilled through two of the feet 88a at diagonally opposite corners of the motor. Holes 101 extend through such feet, through flange 82 and through any shims therebetween. Second, pins 91 are driven into holes 101. Third, shear blocks 114-120 are welded in place.

At this point the critically-aligned components of the drive system are completely assembled on the platform and ready for installation as a unit into the vehicle. It should be noted that the foregoing assembly steps can also include drivably mounted the hydraulic and hydrostatic pumps on the gear box and mounting the fan, cooler, and compressor on the platform and motor to define drive module 32. The pumps, fan, cooler and compressor are preferably mounted after the alignment and securing steps are completed.

Installation is begun by lifting the drive module by suitable lifting means such as a chain hoist (not shown) having a chain hook 166 connected to lifting eye 168 atop the motor. The drive module is then lowered vertically to a position just above the main frame portion of the vehicle, with holes 154 roughly aligned with holes 160.

The lower portions 146 of mounts 144 are positioned on the undersides of flanges 83, 84 with extensions 152 fitted into holes 154. Holes 150 of portions 146 are then aligned with holes 160 and the module is lowered vertically onto the bed. Upper portions 148 are fitted into holes 154, and washers 162 placed thereon. Bolts 156 are inserted through the washers and holes 150, 160. Lock nuts 164 are then threaded onto the bolts and tightened to secure the platform resiliently to the main frame portion.

Connection of the electrical cable to the motor, the air brake hoses to the compressor, and the hydraulic hoses to the pumps and cooler completes installation of the module.

Having illustrated and described a preferred embodiment of the invention, it should be apparent to those skilled in the art that the invention may be modified in arrangement and detail. I claim as my invention all such modifications as come within the true spirit and scope of the following claims.

I claim:

1. An electric-hydraulically powered vehicle comprising:
   a chassis having a main frame portion and an upwardly removable subframe portion;
   resilient mounting means for resiliently mounting the subframe portion on the main frame portion;
   an electric motor and a drive train component independently secured to the subframe portion;
   connecting means for drivingly connected an output shaft of the motor to an input shaft of the drive train component; and
   drive means drivably connected to and supported by the drive train component for powering said vehicle;
   such that the subframe portion, motor and drive train component define a power unit which is upwardly removable as a unit from the main frame portion;
   the subframe portion including adjustable mounting means for positioning the motor and drive train component on the subframe portion to axially align their shafts for connecting while the unit is removed from the main frame portion, and for rigidly securing said motor and drive train component to the surframe portion prior to installation of the unit in the vehicle;
   the adjustable mounting means including means for titling the drive train component relative to the motor to angularly align said shafts before securing to the subframe portion.

2. An electric-hydraulically powered vehicle comprising:
   a chassis having a main frame portion and an upwardly removable subframe portion;

resilient mounting means for resiliently mounting the subframe portion on the main frame portion;

an electric motor and a drive train component secured to the subframe portion;

connecting means for drivingly connecting an output shaft of the motor to an input shaft of the drive train component;

drive means drivably connected to and supported by the drive train component for powering said vehicle;

whereby the subframe portion, motor and drive train component define a power unit which is removable as a unit from the main frame portion;

the subframe portion including adjustable mounting means for positioning the motor and drive train component on the subframe portion to axially align their shafts for connecting while the unit is removed from the main frame portion, and for rigidly securing said motor and gear box to the subframe portion prior to installation of the unit in the vehicle;

the main frame portion including two longitudinal main frame members having a generally parallel, horizontally spaced-apart relationship and two spaced-apart main frame cross-members extending between the longitudinal main frame members;

the subframe portion including two spaced-apart longitudinal subframe members and two subframe cross-members extending between the subframe members and spaced-apart so as to overlie said main frame cross members when said subframe portion is mounted on said main frame portion; and the resilient mounting means including a resilient mount connecting each subframe cross-member to its underlying main frame cross-member in vertically spaced-apart relationship;

the motor and drive train component being secured to the subframe portion by the adjustable mounting means.

3. A vehicle according to claim 2 in which:

the adjustable mounting means includes coplanar upwardly-facing surfaces on the subframe members; mounting feet connected to the motor and adapted for slidingly supporting the motor on said surfaces; shims for spacing the mounting feet upwardly of said surface; a cylindrical bore extending continuously through at least two of said mounting feet, the adjacent frame members and any shims placed therebetween, and a pin tightly fitted each bore.

4. A vehicle according to claims 2 or 3 in which the subframe members each include an upward extension;

said extensions having parallel, inwardly opposed, vertical faces spaced-apart for mounting said drive train component therebetween.

5. An electric-hydraulic drive module adapted for mounting as a unit on the frame of a hydraulically powered vehicle, the frame having an upwardly-facing surface, the module comprising:

an electric motor having a rotating output shaft;

a drive train component having a rotatable input shaft;

platform means for rigidly mounting said motor and drive train component independently thereon with their shafts in axially-aligned, end-to-end relationship, said platform means being adapted for positioning on said upwardly-facing surface;

connection means for connecting said shafts together; and resilient mounting means for mounting said platform on said surface in mechanical isolation from said frame;

said platform including means for tilting said drive train component to angularly align said shafts during assembly of the module.

6. A module according to claim 5 in which said resilient mounting means comprising three resilient mounts triangularly arranged on the underside of said platform, said mounts being operable to absorb any lateral stresses exerted by said frame against said platform means.

7. A module according to claim 6, in which each of said mounts includes a vertically-extending resilient portion sized for insertion vertically into a complementary opening in said platform means.

8. An electric-hydraulic drive module adapted for mounting as a unit on the frame of a hydraulically powered vehicle, the frame having an upwardly-facing surface, the module comprising:

an electric motor having a rotating output shaft;

a drive train component having a rotatable input shaft;

platform means for rigidly mounting said motor and drive train component thereon with their shafts in axially-aligned, end-to-end relationship, said platform means being adapted for positioning on said upwardly-facing surface;

connection means for connecting said shafts together; and resilient mounting means for mounting said platform on said surface in mechanical isolation from said frame;

said platform means including two longitudinal members and two cross-members extending therebetween;

the electric motor, connection means and drive train component being arranged serially along the longitudinal members and the motor and drive train component being secured thereto;

one cross-member being positioned adjacent one end of the motor and the other cross-member being positioned adjacent the opposite end of the motor;

the mounting means including three shock absorbent mounts adapted for maintaining the platform in upwardly spaced-apart relationship with the frame of the vehicle;

one of said mounts being positioned along one of said cross-members and two of said mounts being spaced laterally apart alone the other of said cross-members.

9. A mounting system for mounting an electric motor and a drive train component as a unit on the frame of an electric-hydraulic drive vehicle, the shafts of said motor and said drive train component being drivingly connected in end-to-end relationship, said system comprising:

rigid platform means for receiving the motor and drive train component thereon to define said unit, bed means in the frame of said vehicle having an upwardly facing surface for receiving said platform means thereon;

first resilient mounting means on said surface for removably connecting said platform means to said bed means in substantial mechanical isolation therefrom; and second mounting means for rigidly securing the motor and drive train component to said platform means, said second mounting means being adjustable to angularly align said shafts so as to substantially eliminate vibrations when said shafts are rotated;

said bed means being upwardly unobstructed so that the platform means, motor and drive train component can be lowered as a unit into the vehicle from above onto the resilient mounting means;

the bed means including two spaced-apart main frame members and two spaced-apart transverse main frame members connecting said two main frame members together; and the platform means including two spaced-apart subframe members and two transverse subframe members connecting the subframe members together;

the transverse subframe members being positioned to overlie the transverse main frame members;

the first mounting means including one resilient mount connecting one of the transverse subframe members to its underlying transverse main frame member at a position between said two main frame members and two resilient mounts connecting the other transverse subframe member to its underlying transverse main frame member at two laterally spaced apart positions.

10. A mounting system for mounting an electric motor and a drive train component as a unit on the frame of an electric-hydraulic drive vehicle, the shafts of said motor and said drive train component being drivingly connected in end-to-end relationship, said system comprising:

rigid platform means for receiving the motor and drive train component thereon to define said unit, bed means in the frame of said vehicle having an upwardly facing surface receiving said platform means thereon;

first resilient mounting means on said surface for removably connecting said platform means to said bed means in substantial mechanical isolation therefrom; and second mounting means for rigidly securing the motor and drive train component to said platform means, said second mounting means being adjustable to angularly align said shafts so as to substantially eliminate vibrations when said shafts are rotated;

said bed means being upwardly unobstructed so that the platform means, motor and drive train component can be lowered as a unit into the vehicle from about onto the resilient mounting means;

said platform means including a horizontal, generally planar surface for supporting the motor thereon and a pair of vertical, parallel, planar surfaces, spaced-apart and inwardly opposed for contacting opposite sides of the drive train component;

the second mounting means including first securing means for securing the motor to the horizontal surface and second securing means for securing the drain train component to the vertical surfaces, said vertical planar surfaces being operable to enable tilting the drive train component in a vertical plane for angularly aligning the shaft of the motor with the shaft of the gear box.

11. A method of installing an electric-hydraulic drive system in a hydraulically-driven vehicle; the drive system including an electric motor and a drive train component, such as a gear box, the motor having an output shaft for driving an input shaft in the drive train component, the method comprising:

mounting the motor and drive train component on a platform apart from the vehicle;

aligning said shafts into axial, end-to-end relationship;

securing the motor and drive train component to the platform;

connecting said shafts together;

lowering the platform, with the shafts aligned and the drive system secured thereto, onto a platform-receiving frame portion of the vehicle; and resiliently mounting the platform upon said frame portion;

the aligning step including tilting the drive train components to a position such that its shaft substantially parallels the shaft of the motor.

12. A method according to claim 11 in which:

the mounting step includes placing the motor and drive train component on the platform with their shafts directed generally toward one another, the motor having feet resting on an upwardly-facing mounting surface;

the aligning step includes vertically positioning the drive train component such that its shaft is no closer to said surface than the output shaft of the motor; and following the vertical positioning and tilting steps, the aligning step includes sliding the motor toward the drive train component until their shafts almost contact, sliding portions of the motor laterally until the axis of its shaft is in substantially the same plane normal to said surface as the axis of the drive train component input shaft and elevating portions of the motor until the axis of its shaft is in substantially the same plane as the axis of the drive train component input shaft.

13. A method according to claim 12 in which:

the elevating step includes placing shims between the feet of the motor and said surface, and the securing step includes boring a cylindrical hole through at least two of said feet and through any shims thereunder into the platform, and inserting a tightly-fitting pin in each hole.

14. A method according to claim 11 in which the securing step includes rigidly securing the drive train component to the platform after said alignment step so as to prevent further tilting thereof.

* * * * *

UNITED STATES PATENT AND TRADEMARK OFFICE
CERTIFICATE OF CORRECTION

PATENT NO. : 4,320,814
DATED : March 23, 1982
INVENTOR(S) : Paul J. Middelhoven

It is certified that error appears in the above-identified patent and that said Letters Patent are hereby corrected as shown below:

```
Column  6, line 32, "of" should be--or--;
Column  6, line 36, "connected" should be--connecting--;
Column  6, line 45, "members" should be--member--;
Column  8, line  1, "mounted" should be--mounting--;
Column  8, line 44, "connected" should be--connecting--;
Column  8, line 59, "surframe" should be--subframe--;
Column  8, line 62, "titling" should be--tilting--;
Column  9, line 50, "fitted" should be--fitting--;
Column 10, line 52, "alone" should be--along--;
Column 11, line 37, before "receiving" insert--for--;
Column 11, line 52, "about" should be--above--.
```

Signed and Sealed this

First Day of June 1982

[SEAL]

Attest:

Attesting Officer

GERALD J. MOSSINGHOFF
Commissioner of Patents and Trademarks